United States Patent
Pirelli

[15] 3,682,527
[45] Aug. 8, 1972

[54] COMPOSITE SCREEN FOR LUMINOUS PROJECTIONS WITH A THREE DIMENSIONAL EFFECT

[72] Inventor: Maria Marinelli Pirelli, Via Campi d'Oro, 40, Varese, Italy

[22] Filed: Jan. 15, 1970

[21] Appl. No.: 2,986

[30] Foreign Application Priority Data

Feb. 6, 1969 Italy.....................12550A/69

[52] U.S. Cl.................................................350/123
[51] Int. Cl...........................................G03b 21/60
[58] Field of Search.........350/117, 123, 129; 352/86

[56] References Cited

UNITED STATES PATENTS 1,650,341  11/1927  Goldstein...................350/123

FOREIGN PATENTS OR APPLICATIONS 141,807   4/1920   Great Britain.............350/123

Primary Examiner—Louis R. Prince
Assistant Examiner—Denis E. Corr
Attorney—Waters, Roditi, Schwartz & Nissen

[57] ABSTRACT

A composite screen to be used in combination with a light projector comprises a plurality of screen elements at least one of which has a discontinuous or perforated light diffusing surface, whereby part of the light rays passes through said surface and is projected on one or more other screen elements behind it.

4 Claims, 4 Drawing Figures

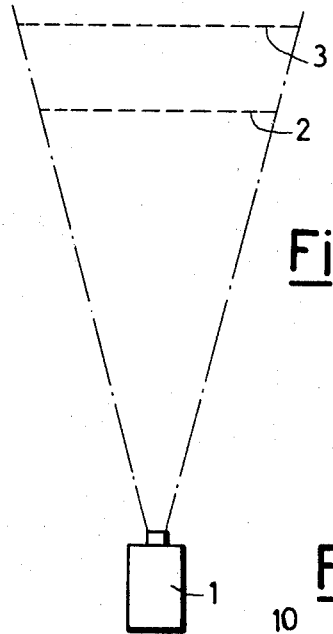
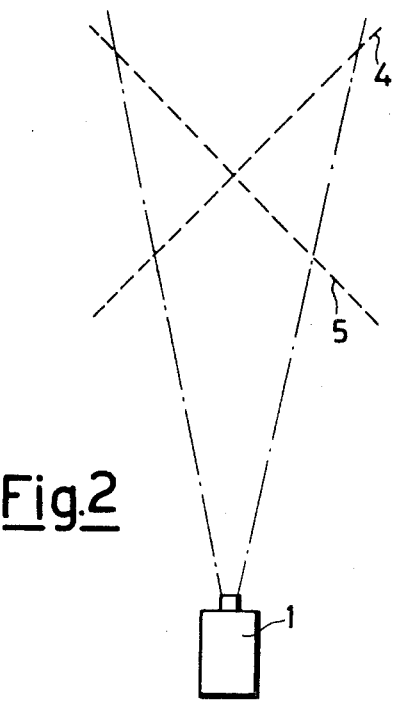
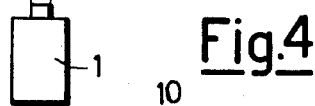
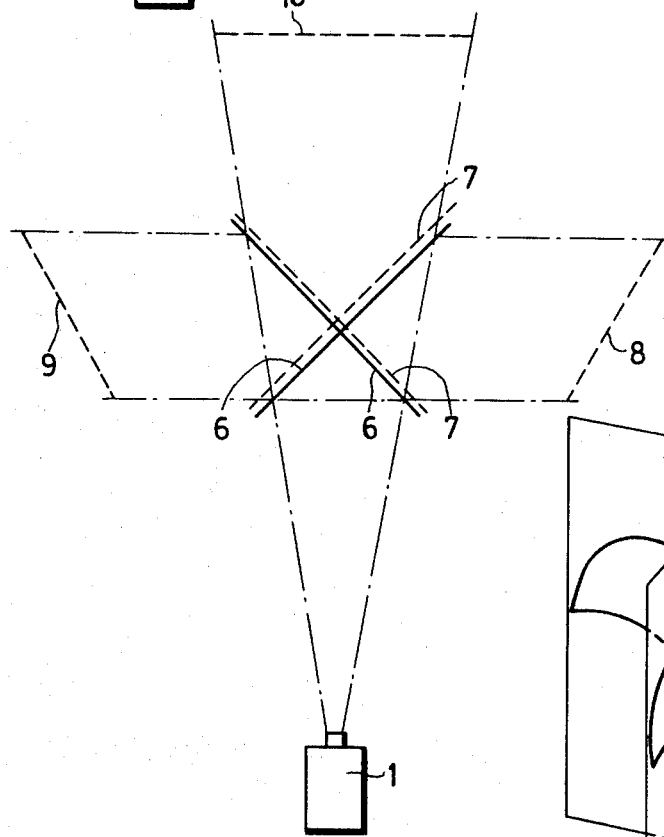
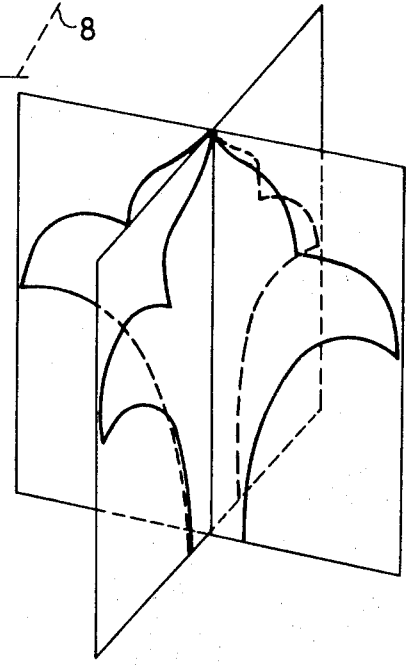

COMPOSITE SCREEN FOR LUMINOUS PROJECTIONS WITH A THREE DIMENSIONAL EFFECT

The invention relates to composite screens which are to be used with light projectors.

An object of the present invention is to give a spacial or three dimensional distribution to a static or cinematographic projection.

Contrary to numerous previous proposals for obtaining stereoscopic vision which are based on the division of visual functions attributed to each of one's two eyes, the present invention collects a number of images disposed in space from a single projection, which are such as to be seen simultaneously by the spectator from any point in the environment without him having to subject himself to any constraint as to his position or any other visual limitation.

According to the invention the spectator may stay or, if he wishes, move between the different images or portions of an image which form and are rendered visible in the surroundings, in such a manner as to position himself within a determined scene and not only in front of it.

The structure of the screen according to the invention comprises essentially a plurality of screen members situated transversally to a luminous beam from a projector, and of which at least that member nearest the projector has a diffusing discontinuous surface; Preferably, in accordance with the invention, all the screen members have this characteristic. According to a feature of the invention, a more interesting effect is obtained when said members die disposed in such a manner as to form suitable angles one with the other in plan view.

A discontinuous diffusing surface in the sense intended above can consist for instance of a veil, gauze or screen, preferably white and more or less fine, impressed on a transparent sheet. The real luminous image projected on to said discontinuous surface is partially intercepted, while a part of the light passes through the transparent spaces between the diffusing parts, in such a manner that a second image can be received by a second screen member; this in its turn can also comprise a discontinuous absorbing surface, and a third screen may be disposed therebehind, and so on.

According to a further embodiment of the invention, it is possible to couple to said discontinuous surface a surface which is at least partially reflecting. This is thus able to retransmit the image on to another screen member, or onto a number of screen members one behind the other if these are provided with a discontinuous absorbing surface.

If the partially reflecting surface is also transparent an image can also be collected behind it.

It can be easily discerned that the screen members so combined together can be very numerous and variably disposed. In particular, when they are spaced from one another sufficiently to allow the passage of a person between them, it is possible to create an environment of images between which the spectator can pass, receiving a multiplicity of interesting effects from every side.

It is obvious that a composite screen of this type is especially effective for static and preferably cinematographic decorative images for artistic or publicity purposes. In order to clarify how a composite screen according to the invention can be constructed in practice, reference will be made hereinafter to the accompanying diagrammatic drawings which illustrate by way of example several embodiments of the invention.

IN THE DRAWINGS

FIG. 1 is a diagrammatic plan view of a basic screen layout;

FIG. 2 is a plan view of another basic layout;

FIG. 3 is a perspective diagrammatic view of the screen shown in FIG. 2;

FIG. 4 is a diagrammatic plan view of another screen with a greater number of members.

FIG. 1 shows a screen 2, behind which there is a second screen 3. The screen 2 consists of a mesh fabric with spaces of the order of 1 or 2 mm., for example, or even greater if the linear enlargement of the projection is relatively great. The projected image is rendered clearly visible on the screen 2 and a part of the light passes through the screen via the mesh spaces of the fabric to farm a second image on the screen 3.

Theoretically, the two images cannot both be in focus, but if the depth of the lens of the projector 1 is sufficient the resulting slight blurring may be practically unnoticeable, especially with suitably studied images.

In FIG. 2, the composite screen consists of two screen members 4 and 5 which cross one another. The light transmitted by the projector 1 forms two half images on the two front parts of the screens and two almost equal images on the two back parts. A spectator who moves around this screen has a three dimensional vision of the projected image. If, for example, this image is a flower with an axis of symmetry approximately coinciding with the intersection line of the two members 4 and 5, it will approximate the illusion of a three dimensional flower, in the manner indicated diagrammatically in FIG. 3.

If two partially transparent surfaces (not shown) are coupled to the discontinuous screen members 4 and 5, two further slightly enlarged half images will be reflected on the said members 4 and 5 which by superposition on the first images can give a certain relief effect, or otherwise interesting visual effects.

As stated above, each screen member as employed in FIG. 4 can also comprise a surface which is at least partially reflecting. For example, with reference to FIG. 4, the partially reflecting crossed screen members can consist of a reflective fabric veil 6 coupled to a supporting sheet of transparent fabric material 7, or may consist only of the partly transparent, partly opaque and reflective sheet 6 on which a grid of more or less dense with white lines or points has been printed. In such a case the light not only passes beyond the screen member which receives an image, but is also partly reflected or mirrored to other screen members, these in the case under consideration being the members 8 and 9 which can also receive an image. The light which passes beyond the members 6 and 7 may partly be absorbed by the member 10 and, if desired, still partly reflected in the same manner as a reflecting surface coupled to it and retransmitted onto other members.

Surfaces which are at least partially reflecting can be also interposed in the path of the luminous rays separately from the absorbing surfaces.

These examples are only indicative and represent simplified solutions. It is evident on the basis of the preceding explanations that the composite screen may be very much more complex and may also receive light from a number of projectors simultaneously from different directions, in such a manner as to obtain the most varied effects.

WHAT WE CLAIM IS:

1. A composite screen for luminous projections in a three dimensional space, comprising a plurality of screen members arranged one behind the other in the direction of projection of an image, at least one screen member including a discontinuous surface which is partially reflective and partially transparent the reflective portion of said one screen member reflecting the image onto another one of said screen members.

2. A screen as claimed in claim 1, in which said discontinuous surface comprises a mesh fabric containing a high percentage of open spaces.

3. A screen as claimed in claim 1, in which said discontinuous surface comprises a screen imprinted on a transparent sheet.

4. A screen as claimed in claim 1, in which said screen members comprises a mesh member which is reflective and a transparent member coupled with the mesh member to transmit the image which passes the mesh member.

* * * * *